US007299200B2

(12) United States Patent
Manstein et al.

(10) Patent No.: US 7,299,200 B2
(45) Date of Patent: Nov. 20, 2007

(54) CURRENCY-TIME LINE TRANSACTION SYSTEM AND METHOD

(76) Inventors: Ralf Manstein, Sophienstr. 26, 76530 Baden-Baden (DE); Ursula Herzog-Denu, Werderstr. 10, 76530 Baden-Baden (DE)

( * ) Notice: Subject to any disclaimer, the term of this patent is extended or adjusted under 35 U.S.C. 154(b) by 752 days.

(21) Appl. No.: 10/748,856

(22) Filed: Dec. 30, 2003

(65) Prior Publication Data

US 2005/0144111 A1    Jun. 30, 2005

(51) Int. Cl.
*G06Q 30/00* (2006.01)
*G06F 17/30* (2006.01)
*G07F 7/00* (2006.01)

(52) U.S. Cl. .......................................... 705/26; 705/27
(58) Field of Classification Search .................. 705/26, 705/27, 37
See application file for complete search history.

(56) References Cited

U.S. PATENT DOCUMENTS

| | | | |
|---|---|---|---|
| 5,794,207 A | 8/1998 | Walker et al. | |
| 6,058,417 A | 5/2000 | Hess et al. | |
| 6,415,320 B1 | 7/2002 | Hess et al. | |
| 6,418,415 B1 | 7/2002 | Walker et al. | |
| 6,466,919 B1 | 10/2002 | Walker et al. | |
| 2002/0107777 A1* | 8/2002 | Lane et al. | 705/37 |
| 2002/0152154 A1* | 10/2002 | Rothman et al. | 705/37 |
| 2003/0126040 A1 | 7/2003 | Mesaros | |
| 2006/0047581 A1* | 3/2006 | La Mura et al. | 705/26 |
| 2006/0190352 A1* | 8/2006 | Zeidman | 705/26 |

FOREIGN PATENT DOCUMENTS

WO    WO 03/063036    * 7/2003

OTHER PUBLICATIONS

Spencer Chin, Reverse auctions come home to roost—Allocation does little to dampen OEM enthusiasm for online tool, EBN. Manhasset: Dec. 8, 2003, p. 1 http://proquest.umi.com/pqdweb?did=484724091&sid=1&Fmt=3&clientId=19649&RQT=309&VName=PQD.*

* cited by examiner

*Primary Examiner*—Yogesh C. Garg
*Assistant Examiner*—Mila Airapetian
(74) *Attorney, Agent, or Firm*—Jennifer Meredith, Esq; Meredith & Keyhani, PLLC

(57) ABSTRACT

Rather than the traditional methods of bilateral costing, namely either fixed pricing or an auction type environment, this unique method allows both the buyer and seller to have an influence over the price of the products or service being exchanged in the transaction, while also factoring and controlling the time the product or service is available to potential buyers into the sale price. The potential buyer makes a value offer which may include a price offer or time offer. Where the buyer makes a value offer, they are offering to purchase a time unit in order to purchase the product, wherein the remaining time in reduced according to the amount of time units purchased and the current price is raised according to the price of the time units. Price offers and time offers are interdependent. A time offer entry will show the corresponding price on the currency axis (currency can be anything that can be exchanged at a value) and a price offer entry will show the corresponding time on the time axis.

55 Claims, 5 Drawing Sheets

CURRENCY-TIME LINE TRANSACTION SYSTEM AND METHOD

BACKGROUND OF THE INVENTION

The present invention relates to the process of selling/purchasing a product using a method, which allows both the buyer and seller to influence the price, while also controlling the time the product or service is for sale.

One of the most common bilateral costing schemes, encountered daily by consumers is referred to as fixed pricing. This scheme involves the seller setting a fixed price for the product or service of interest based on past, current and anticipated future market demand. Buyers interested in purchasing the product or service must pay the fixed price. This may or may not take into account the quantity purchased and generally does not take into account the time the purchase is made. While this method provides a simple way for the seller to conduct business with a large number of buyers, it fails to reward buyers interested in buying the product soon after it is available for sale or in quantities larger than one. A common method to reward a buyer interested in large quantity purchases is using a scheme commonly known as discount quantity pricing. This scheme lowers the price associated with the product or service of interest in relation to the quantity the consumer is willing to purchase. This is possible as the fixed cost can be spread over more items, allowing the seller to still make sufficient profit, while offering the reduced price to a consumer. One drawback associated with this method is that consumers interested in smaller quantities are often discouraged by their inability to obtain the lower prices available to large quantity buyers. This results in buyers becoming more and more likely to look elsewhere for a lower price, concurrently resulting in a loss of business for the seller.

Another common bilateral costing scheme is through an auction format. In an auction the seller has the opportunity to set a minimum price, allowing multiple buyers the opportunity to bid against each other for the right to purchase the product. Recently trends in this type of market have been to use an electronic auction system over the Internet such as eBay, Inc. or uBid, Inc. This style of auction provides a great advantage to sellers with small quantities for sale, allowing them to maximize profit, specifically those with a unique product or service which many consumers are willing to competitively bid over.

A bilateral buyer-driven process of bidding has also recently become a popular costing scheme, yielding certain benefits and efficiencies, which other commerce systems cannot. This method involves an individual buyer setting a price they are willing to pay for a product or service of interest. This price is broadcast or published to a multitude of sellers who then have the opportunity to review the offer and if it is satisfactory, offer the buyer an opportunity to purchase the product or service of interest. The most common buyer-driven bidding scheme is described in detail in U.S. Pat. No. 5,794,207 by Walker Asset Management Limited Partnership. As each of the above referenced costing schemes, this method has both advantages and disadvantages depending on the type of transaction. The buyer essentially receives the greatest advantage, as offering any reasonable price to a multitude of sellers will commonly result in at least one seller accepting the bid at hand. Yet the disadvantage associated with this is that buyers are open to the risk of being inundated with a multitude of offers from potential sellers. However sellers are often more willing to sell a product or service at a price much lower than normal, in an effort to move a larger quantity. Additionally, the uncertainty surrounding the acceptance of a buyer's bid can prove problematic for commercial applications where reliable, high-volume transactions are of utmost importance.

Each of these bilateral costing schemes have their respective set of situations where they lend a significant advantage to either the buyer or seller, none truly offer a method in which both parties involved stand to gain a significant advantage in both ease of transaction and maximization of ultimate value.

Methods of volume pricing and utilizing Conditional Purchase Offers (CPOS) have been disclosed in prior art. U.S. Patent Application No. 2003/0126040 applied for by Mesaros discloses a system of volume pricing for use in e-commerce. Mesaros teaches a method of volume pricing where a seller establishes a price structure dependent on the quantity of product or service purchased, which is published electronically to potential customers. The seller proceeds to set the duration of a specific period during which orders for the product or service of interest will be accepted. At the conclusion of the ordering period the price is calculated using the lowest price based on the originally released price structure and the total quantity of products sold.

Walker teaches a method for aggregating multiple buyers utilizing CPO in U.S. Pat. No. 6,466,919. This method involves receiving and processing CPOS to determine if the CPO should be provided to sellers individually or as part of an aggregate CPO. Once the CPO is accepted, whether individually or as part of an aggregate CPO, both the buyer and seller are bound to the transaction Traditional methods, as well as those taught by Walker and Mesaros lack an ability to account for the period of time taken for a transaction to be completed. A product or service purchased within minutes of the seller introducing the item of interest to the market could ideally sell at a lower price due to the short time period required to market the item. However by the same means, an item, which takes significantly longer to sell, should attract a higher price due to the lengthened time between the introduction of the product or service to the market and the final sale. This could be represented in the form of advertising costs, cost of holding the item in inventory or a variety of other means.

SUMMARY OF THE INVENTION

Rather than the traditional methods of bilateral costing, namely either fixed pricing or an auction type environment, this unique method allows both the buyer and seller to have an influence over the price of the products or service being exchanged in the transaction, while also factoring and controlling the time the product or service is available to potential buyers into the sale price. The potential buyer makes a value offer which may include a price offer or time offer. Where the buyer makes a value offer, they are offering to purchase a time unit in order to purchase the product, wherein the remaining time in reduced according to the amount of time units purchased and the current price is raised according to the price of the time units. Price offers and time offers are interdependent. A time offer entry will show the corresponding price on the currency axis (currency can be anything that can be exchanged at a value) and a price offer entry will show the corresponding time on the time axis.

According to a preferred embodiment, a method for facilitating a trade is disclosed comprising the steps of receiving input from the seller including a product, product information, a minimum price, maximum price and a maximum time. Offering the product for sale wherein the offer for sale starts at the minimum price and the maximum time and displays the current price and the remaining time. Receiving at least one value offer for the product from at least one buyer, wherein the step of receiving at least one value offer may be a first, subsequent or final offer. Each offer is displayed. Accepting the first offer when the first offer results in a price greater than or equal to the minimum price and greater than or equal to the current price and results in time units to be purchased less than or equal to the maximum time and less than or equal to the remaining time. Increasing the current price by a determined price amount and decreasing the remaining time by a determined time amount for the first offer that results in a price greater than the minimum price and greater than the current price and results in time units to be purchased less than or equal to the maximum time and less than or equal to the remaining time. The first offer is displayed as the current price and the remaining time. Accepting the subsequent value offer wherein each subsequent value offer results in a price greater than the current price and results in time units to be purchased smaller than the remaining time. Increasing the current price by a determined price amount and decreasing the remaining time by a determined time amount for each subsequent value offer that results in a price greater than the current price and results in time units to be purchased less than the remaining time. The subsequent value offer is displayed as the current price and remaining time. Accepting the final value offer wherein the final value offer results in a price greater than the current price and results in time units to be purchased which set the remaining time to zero. Increasing the current price by a determined price amount and decreasing the remaining time by a determined time amount to zero for the final value offer that results in a price greater than the current price and results in time units to be purchased equal to the remaining time. The final value offer is displayed as the current price and remaining time.

According to another embodiment, a computer implemented method for facilitating trade over the Internet is disclosed comprising the steps of receiving input from the seller wherein the input includes a product, product information, a minimum price, a maximum price and a maximum time. Offering the product for sale wherein the offer for sale starts at the minimum price and the maximum time and displays the current price and the remaining time. Receiving at least one value offer for the product from at least one buyer, wherein the step of receiving at least one value offer is a first, subsequent or final value offer. Each offer is displayed. Accepting the first value offer when the first value offer results in a price greater than or equal to the minimum price and greater than or equal to the current price and results in time units to be purchased less than or equal to the maximum time and less than or equal to the remaining time. Increasing the current price by a determined price amount and decreasing the remaining time by a determined time amount for the first value offer that results in a price greater than the minimum price and greater than the current price and results in time units to be purchased less than or equal to the maximum time and less than or equal to the remaining time. The first value offer is displayed as the current price and the remaining time. Accepting the subsequent value offer wherein each subsequent value offer results in a price greater than the current price and results in time units to be purchased smaller than the remaining time. Increasing the current price by a determined price amount and decreasing the remaining time by a determined time amount for each subsequent value offer that results in a price greater than the current price and results in time units to be purchased less than the remaining time. The subsequent value offer is displayed as the current price and remaining time. Accepting the final value offer wherein the final value offer results in a price greater than the current price and results in time units to be purchased which set the remaining time to zero. Increasing the current price by a determined price amount and decreasing the remaining time by a determined time amount to zero for the final value offer that results in a price greater than the current price and results in time units to be purchased equal to the remaining time. The final value offer is displayed as the current price and remaining time.

According to another embodiment, an automated method, performed by a computer for facilitating a trade over the Internet comprising the steps of receiving input from the seller wherein the information includes a product, product information, a minimum price, maximum price and a maximum time. Creating a data record containing a description of the product based upon input form the seller, the data record being associated with the seller and being stored in a computerized electronic database. Generating an identification code to uniquely identify the product. Offering the product for sale through a worldwide web mapping module translating information from the data record to a language format for presentation through the Internet, wherein the offer for sale starts at the minimum price and the maximum time and displays the current price and the remaining time. Receiving at least one value offer for the product from at least one buyer, wherein the step of receiving at least one value offer is a first, subsequent or final value offer. Each offer is displayed. Accepting the first value offer when the first value offer results in a price greater than or equal to the minimum price and greater than or equal to the current price and results in time units to be purchased less than or equal to the remaining time and less than or equal to the maximum time. Increasing the current price by a determined price amount and decreasing the remaining time by a determined. time amount for the first value offer that results in a price greater than or equal to the minimum price and greater than or equal to the current price and results in time units to be purchased less than or equal to the remaining time and less than or equal to the maximum time. The first value offer is displayed as the current price and the remaining time. Accepting the subsequent value offer wherein each subsequent value offer results in a price greater than the current price and results in time units to be purchased smaller than the remaining time. Increasing the current price by a determined price amount and decreasing the remaining time by a determined time amount for each subsequent value offer that results in a price greater than the current price and results in time units to be purchased less than the remaining time. The subsequent value offer is displayed as the current price and remaining time. Accepting the final value offer wherein the final value offer results in a price greater than the current price and results in time units to be purchased which set the remaining time to zero. Increasing the current price by a determined price amount and decreasing the remaining time by a determined time amount to zero for the final value offer that results in a price greater than the current price and results in time units to be purchased equal to the remaining time. The final value offer is displayed as the current price and remaining time.

According to yet another embodiment, a system for processing the sale of a good or service comprising a memory device and a processor disposed in communication with the memory device wherein the processor further comprises the ability to receive input from the seller the input including a product, product information, a minimum price, a maximum price and a maximum time. Offer the product for sale, wherein the offer for sale starts at the minimum price and the maximum time and displays the current price and the remaining time. Receive at least one value offer for the product from at least one buyer, wherein the step of receiving at least one value offer is a first, subsequent or final value offer. Each offer is displayed. Accept the first value offer when the first value offer results in a price greater than or equal to the minimum price and greater than or equal to the current price and results in time units to be purchased less than or equal to the remaining time and less than or equal to the maximum time. Increase the current price by a determined price amount and decreasing the remaining time by a determined time amount for the first value offer that results in a price greater than the minimum price and greater than the current price and results in time units to be purchased less than or equal to the remaining time less than or equal to the maximum time. The first value offer is displayed as the current price and the remaining time. Accept the subsequent value offer wherein each subsequent value offer results in a price greater than the current price and results in time units to be purchased smaller than the remaining time. Increase the current price by a determined price amount and decreasing the remaining time by a determined time amount for each subsequent value offer that results in a price greater than the current price and results in time units to be purchased less than the remaining time. The subsequent value offer is displayed as the current price and remaining time. Accept the final value offer wherein the final value offer results in a price greater than the current price and results in time units to be purchased which set the remaining time to zero. Increase the current price by a determined price amount and decreasing the remaining time by a determined time amount to zero for the final value offer that results in a price greater than the current price and results in time units to be purchased equal to the remaining time. The final value offer is displayed as the current price and remaining time.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

During a traditional purchase the buyer usually has no control over the price of a product. Normally it is an immediate purchase at a set price with an accepted time delay that may range from a few seconds to many years until the buyer receives the product. It should be understood that the term product is intended to describe anything for sale and may include services. During an auction, the buyer can influence the increase of the price by placing a higher bid. Another buyer, though, may outbid and be the winner. The buyer influences the price but not the time. With the present invention, though, the buyer may influence both time and price of a product. According to this. method of selling a product, the buyer may influence the value of the product and the time the product is for sale. One of the guiding principles behind this method is that "time is money."

Figure 1:
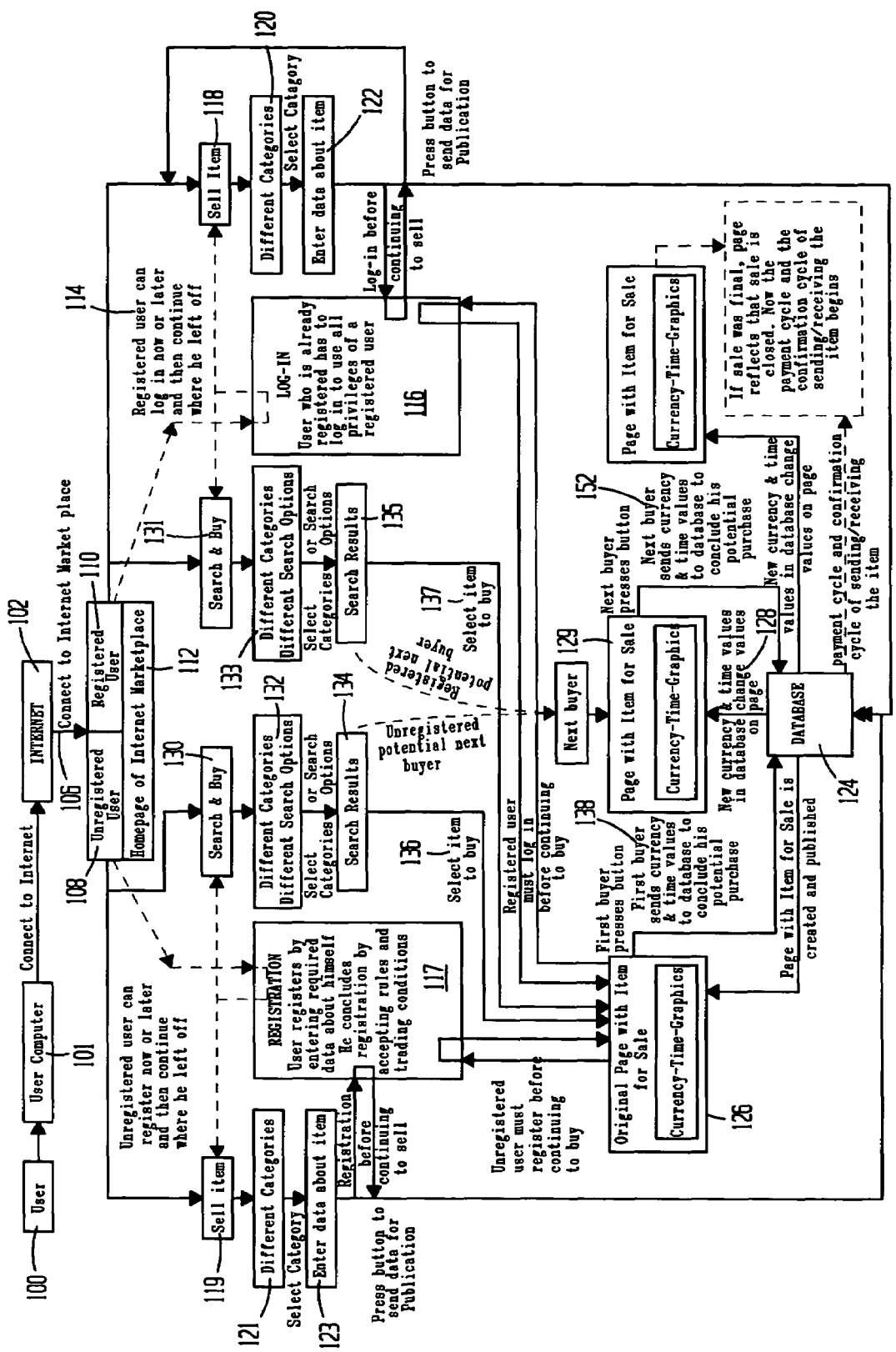
FIG. 1 depicts a broad overview of the process and methods according to the present invention.

FIG. 1 is intended to provide a broad overview of the process and methods according to the present invention. As shown, there is a user (100) and a processor, such as a user computer (101). The user computer (101) is in communication with a memory device such as a database (124). It should be understood that the term user (100) is intended to encompass a potential buyer and/or potential seller. The user may connect to the internet (102) using internet connection hardware, then connect to the internet market place (106). The internet market place may be a home page or website. There the user (100) is prompted to enter as an unregistered user (108) or a registered user (110). Obviously this occurs at the homepage of the internet market place (112). A registered user (100) may login now or later and then continue where they left off (114). A user (100) who is already registered has to log in to use all privileges (116) but may browse or view products for sale without log-in. A user (100) who is not registered may browse or view products for sale, but must be registered in order to offer to purchase or sell a product or service. A user (100) may sell a product (118, 119). There may be different categories (120, 121), a category may be selected, and data may be entered (122, 123) about the product. The database (124) is configured to handle receiving input from the seller including a product, product information, a minimum price, a maximum price and a maximum time. Where the user is unregistered (108) they must register before actually selling or buying the product. The personal information given during registration and the product information may be stored in a database (124) as user information. The user information is used to create an original page with the product or service offered for sale (126). The offer for sale starts at the minimum price and the maximum time and displays the current price and the remaining time. On this page there may be the Currency-Time Graphic shown. The product is "live" and for sale on the web page. A user (100) may buy a product. A buyer (who may be a registered user 110 or an unregistered user 108) may search for the product (130, 131), different categories and different search options (132, 133) may be utilized to search. The search results (134, 135) are provided based upon this input. The user (100) may then select a product (136, 137) view the page with the product (126). If the user decides to make an offer, they offer to purchase the product for a price (138). Also, the buyer may offer to purchase an amount of time. A value offer may be a price offer or a time offer. It may be accepted. The value offer is then stored in the database (124) and the currency-time graphic on the webpage (129) is updated (128). Multiple buyers may view the webpage (129) and multiple buyers may offer to purchase the products for sale. A value offer may be an offer to purchase the product for a certain price, wherein the remaining time is reduced according to the cost of the newly purchased amount of time units. A value offer may be an offer to purchase a time unit, wherein the remaining time is reduced according to the amount of time units purchased and the current price is adjusted according to the cost of those time units. Price offers and time offers are interdependent. A time offer entry will show the corresponding value on the currency axis. The value offer entered into one of the price entry fields on the currency axis will show the corresponding time offer amounts on the time axis. The database (124) receives the value offer, and accepts that value offer according to certain criteria. Price offers would be a specific amount a buyer is willing to pay for a product, it is equal to a time offer, wherein the cost of a time unit is calculated according to the maximum price, the minimum price and maximum time (the potential sales time). A time offer is an offer to purchase a certain amount of time, it is equal to a price offer, wherein the cost of a time unit is calculated according to the maximum price, the minimum price and the maximum time (the potential sales time). Value offers (including price offers and time offers) may be accepted in a number of different ways. The minimum requirements of acceptance are: for a first buyer the value offer has to result at least in a price equal to the minimum price and equal to the current price and results in no time units to be purchased; for a subsequent buyer the value offer has to result at least in a price greater than the minimum price and greater than the current price and results in time units to be purchased smaller than the remaining time; for a final buyer the value offer has to result in a price greater than the current price and results in time units to be purchased which set the remaining time to zero. (As these are only minimum requirements per buyer, a first buyer can also act according to the minimum requirements for a subsequent and final buyer, a subsequent buyer can also act according to the minimum requirements asked of the final buyer.) By way of example, where the value offer is a price offer and it is accepted it may lead to the following scenarios: (1) the remaining time is greater than zero and the value offer (price offer) is equal to the minimum price, this may be offered from a first buyer and trade continues; (2) the remaining time is greater than zero and the value offer (price offer) is greater than the minimum price, this may be offered from a first buyer or subsequent buyers and trade continues; (3) the remaining time is equal to zero and the value offer (price offer) is equal to the minimum price, this may occur as a first buyer remains the only buyer and the value offer (price offer) was the minimum price with the time running out automatically and no other buyer appearing and the trade is concluded; (4) the remaining time is equal to zero and the value offer (price offer) is greater than the minimum price, this may occur when the first or subsequent buyer is the final buyer and the value offer (price offer) is higher than the minimum price with the time running out automatically and no other buyer appearing. The achieved price is the highest potential sales price, trade is concluded; (5) the remaining time is equal to zero and the value offer (price offer) is equal to the maximum price, in this case the first buyer remains the only and final buyer, the value offer (price offer) is the maximum price zeroing the remaining time and the trade is concluded; (6) the remaining time is equal to zero and the value offer (price offer) is equal to the highest potential sale price, in this case the subsequent buyer is the final buyer, the value offer (price offer) is the highest achievable price under the circumstances which are dependant on the coincidental and fixed trade conditions and the trade is concluded.

Where the value offer is a time offer and it is accepted it may lead to the following scenarios: (1) the current price is equal to the minimum price and the value offer (time offer) is equal to zero, this may be a value offer (time offer) of the first buyer without change in the potential sales time and trade continues; (2) the current price is greater than the minimum price and the value offer (time offer) is smaller than the remaining time (potential sales times), this may be a value offer (time offer) of first buyer or subsequent buyers and trade continues; (3) the current price is equal to the minimum price and the value offer (time offer) is equal to zero, in this case the first buyer remains the only buyer with the time running out automatically and no other buyer appearing, the trade is concluded; (4) the current price is greater than the minimum price and the value offer (time offer) is smaller than the potential sales time, in this case a first or subsequent buyer remains the final buyer with the time running out automatically and no other buyer appearing. The achieved price is the highest potential sales price, the trade is concluded; (5) the current price is equal to the maximum price and the value offer (time offer) is equal to the maximum time, in this case the first buyer remains the sole and final buyer as the time offer is zeroing the potential sales time; (6) the current price is equal to the highest potential sales price and the value offer (time offer) is equal to the remaining potential sales time which is dependent on coincidental and fixed trade conditions, in this case the subsequent buyer is the final buyer as the time offer is zeroing the potential sales time and the trade is concluded.

According to one embodiment, a system for processing the sale of a good or service is disclosed. The system may have a memory device, which may be a database (124). There may also be a processor such as a user computer (101) disposed in communication with the memory device and the processor configured to: handle receiving input from the seller (e.g. 122, 123) including a product, product information, a minimum price, a maximum price, and a maximum time (212); this input may be saved in the database (124) and utilized to create a marketplace were the product is offered for sale (e.g. a webpage 129). The sale would typically start at the minimum price (at the start of the trade this is equal to the current price (202)) and the maximum time (210) (at the start of the trade this is equal to the remaining time (210)) and display the current price (202) and the time remaining (210). Next, at least one value offer for the product (128, 138, 152) may be received from at least one buyer, wherein the value offer (price offer or time offer) is accepted according to the minimum requirements (see above) and can lead to certain scenarios (see above) upon acceptance.

At least one value offer for the product may be received from at least one buyer, wherein the step of receiving the value offer is that of a first value offer, the next steps are: displaying the first value offer; accepting the first value offer when the first value offer results in a price greater than or equal to the minimum price and greater than or equal to the current price and less than or equal to the maximum time and results in time units to be purchased less than or equal to the remaining time; increasing the current price by a determined price amount and decreasing the remaining time by a determined time amount for each first value offer that results in a price greater than the minimum price and greater than the current price and results in time units to be purchased less than or equal to the maximum time and less than or equal to the remaining time; and displaying the first value offer as the current price and remaining time. At least one value offer for the product may be received from at least one buyer, wherein said step of receiving the value offer is that of a subsequent value offer, the next steps are: displaying the subsequent value offer; accepting the subsequent value offer wherein the subsequent value offer results in a price greater than the current price and results in time units to be purchased smaller than the remaining time; increasing the current price by a determined price amount and decreasing the remaining time by a determined time amount for each subsequent value offer that results in a price greater than the current price and results in time units to be purchased less than the remaining time; and displaying the subsequent value offer as the current price and remaining time. At least one value offer for the product may be received from at least one buyer wherein the step of receiving the value offer is that of a final value offer, the next steps are: displaying the final value offer; accepting the final value offer wherein the final value offer results in a price greater than the current price and results in time units to be purchased which set the remaining time to zero; increasing the current price by a determined price amount and decreasing the remaining time by a determined time amount to zero for the final value offer that results in a price greater than the current price and results in time units to be purchased equal to the remaining time; and displaying the final value offer as the current price and remaining time.

The system may also, iteratively, adjust the highest achievable potential price which theoretically is the maximum price according to fixed and coincidental trade characteristics. These characteristics may be defined as any information that may be ascertained by seller input, a value offer and/or the acceptance of a value offer. This may include: seller input relating to the minimum price, maximum price and maximum time, and buyer input including buyer information, length of time between value offers and the amount of the price offer or the time offer and the difference between value offers, specific engagement rules of this marketplace, specific calculation of the cost of a time unit and the number of buyers. The purpose is to buy a product, but buying time units affects the time the product is offered for sale. The product may be electronically offered for sale over the Internet (126, 129) and is displayed to all internet users on a webpage (129) but may only be bought or sold by users who have electronically registered on the Internet (117) to gain access to the sales function. The system may also accept input to the processor including a desired quantity by the seller, display the maximum price, display the current price in different currencies, display the remaining time, handle ensuring delivery of the product.

Figure 2:
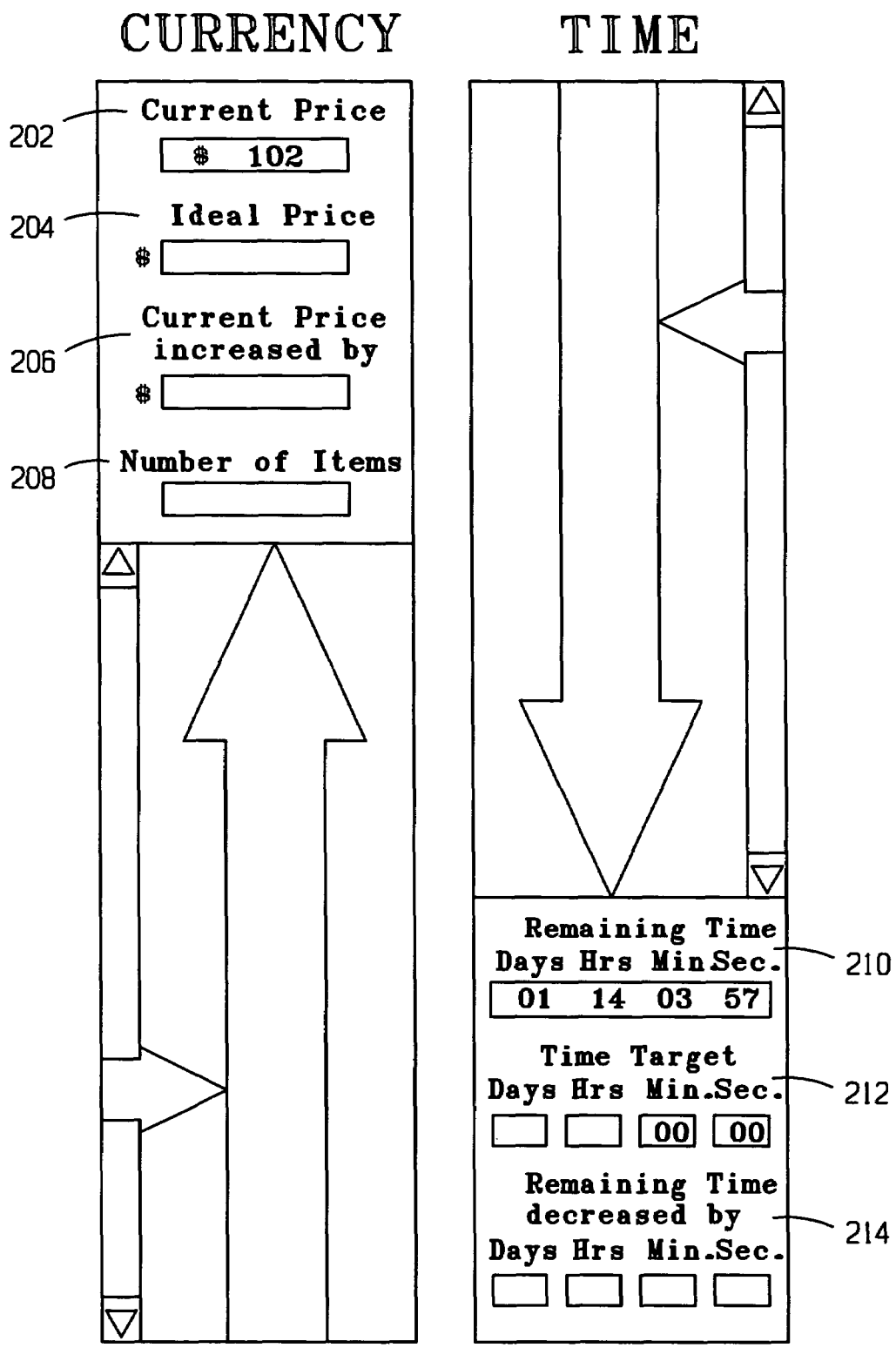
FIG. 2 depicts a method according to the present invention.

FIG. 2 depicts a graphical representation of the currency-time relationship. The term currency is intended to mean any values that relate to the price or value of the product. On the currency axis one data field shows the current price (202) of the product. This is the price of the product at that moment in time, which may change if another value offer is received for the product from a buyer that is greater than a previous value offer. A second field allows the buyer to enter his ideal price (204) for the product. Typically, the buyer would enter his ideal price (204). Alternatively, the buyer could enter the additional amount they want to increase the current price by into a third field, current price increased by (206). In a fourth field the buyer may specify the number of products (208) they want to buy. This is optional and not integral to the invention at hand, but rather a convenience to buyers and sellers. Accompanying these fields is a visual representation of the 'current price' (202) or the 'current price increased by' (206) or the 'ideal price' (204) entered into the data field. Theoretically every field could be represented visually. Visual representation of currency may be an active entry field or a passive indicator field or a combination of both. Minimum and maximum possible price and the number of products available are shown in the actual description of the product not in the graphic. The currency, as entered or displayed anywhere, can be any type of exchangeable value: Dollars, Euros, British Pounds, Camels, gold, etc. any product of value that has been specified as the currency for the trade.

On the time axis a clock shows the remaining time (210) the product may (potentially) be available. A second set of time data fields allows the buyer to enter the point in time to which he would like to reduce the time the product stays available, called the"time target" (212). Alternatively he could enter the amount of time he wants to decrease the remaining time by into a third field "remaining time decreased by" (214). Accompanying these fields is a visual representation of the "remaining time" (210) or the "remaining time decreased by" (214) or the "time target" (212) entered into the data fields. Theoretically every field could be represented visually. Visual representation of time may be an active entry field or a passive indicator field or a combination of both. A time unit can be an hour, a day, a year, a light year, a minute etc. although the smallest time unit, a second, will provide the most flexible and most practicable way of buying and selling time units and products associated therewith.

FIG. 2 is intended to show a sample of how the currency and time may be depicted. However, it is not necessary that all entry fields be present. Theoretically only one entry field (e.g. ideal price 204 or current price increased by 206) in the currency axis and one indicator field in the time axis (e.g. time target (212) and remaining time decreased by (214)) or one indicator field inserted into the currency axis and one entry field into the time axis are necessary to depict the relationship for buyers and sellers. In practice, though, the user will always want—for orientation purposes—the indicator fields showing the 'current price' and the 'remaining time'. Without them he may lose track of the trade status of the product being offered for sale. For the purposes of illustration, select fields are depicted. In order to illustrate the system clearly we have chosen the visual representation of currency to be a combination indicator/entry field for the 'Current Price' and the visual representation of time to be a combination indicator/entry field for the 'Remaining Time'.

FIG. 2 is a physical representation of the principles of the Currency-Time Line Transaction System. To buy a product, the buyer needs to reduce the time to zero. In a sense the buyer is not buying the product, but rather the units of time related to the product. The countdown, or time remaining (210), begins at a predetermined point that may be chosen by the seller or the operator of the marketplace (e.g. the moment of online publication, the first sales click, etc., theoretically any other starting point can be chosen) and runs to zero automatically or is reduced by a determined time amount when a buyer purchases a block of time. The product is sold to the buyer who reduces the remaining time to zero. Generally, the determined time amount is calculated by first determining the value of a unit of time which is equal to the maximum price minus the minimum price divided by the maximum time (the potential sales time). Then dividing the amount the current price offer is increased by the value of a unit of time we arrive at the determined time amount. Minimum price, a maximum price and a maximum time (the potential sales time) are chosen by the seller. The moment the product is offered for sale the current price is the minimum price and the remaining time is the length of time chosen by the seller.

So, for example, lets assume the seller has chosen a maximum price of $5.00 (or 500 cents) and a minimum price of $1.40 (or 140 cents) and a potential sales time as one hour (or 3600 seconds). The value of a unit of time would be:

Value of a unit of time=(Max−Min)/(sales time)

(500−140)/3600=0.1 cents/second

A price value offer of $2.00 would effectively be calculated into time according to the following calculation:

Determined time amount=(value offer)/(value of a unit of time)

200 cents/0.1 cent/second=2000 seconds

As such a price value offer of $2.00 would effectively reduce the time remaining by 2000 seconds. Alternatively, a buyer may give a time value offer. He offers to buy a certain amount of time units. To arrive at the determined price amount the current price must be increased by, multiply the value of the time unit with the number of time units to be purchased. For example if the buyer wants to purchase 33 minutes and 20 seconds, which is equal to 2000 seconds, the value of the time unit is 0.1 cents per second.

Determined price amount=(value of time unit)× (number of time units to be purchased)

(0.1)×(2000)=200 cents=2 dollars

As such, a time value offer of 2000 seconds would effectively increase the price by 2 dollars. It should be noted, that obviously all currency and time must be compared in similar manners. That is, where a value offer is in dollars, it may be required to convert to cents. Also, time may be required to be converted to smaller or larger units. The most flexible unit of time for our purposes would be the second. During sales free intervals the time runs automatically. Where sales are occurring, the transaction time will be reduced by potential buyers who buy units of time entering a price value offer or a time value offer. A suitable additional price increase or time decrease can set the clock to zero at any time. The buyer who made the last value offer zeroing the remaining time is now the actual buyer of the product.

Figure 3:
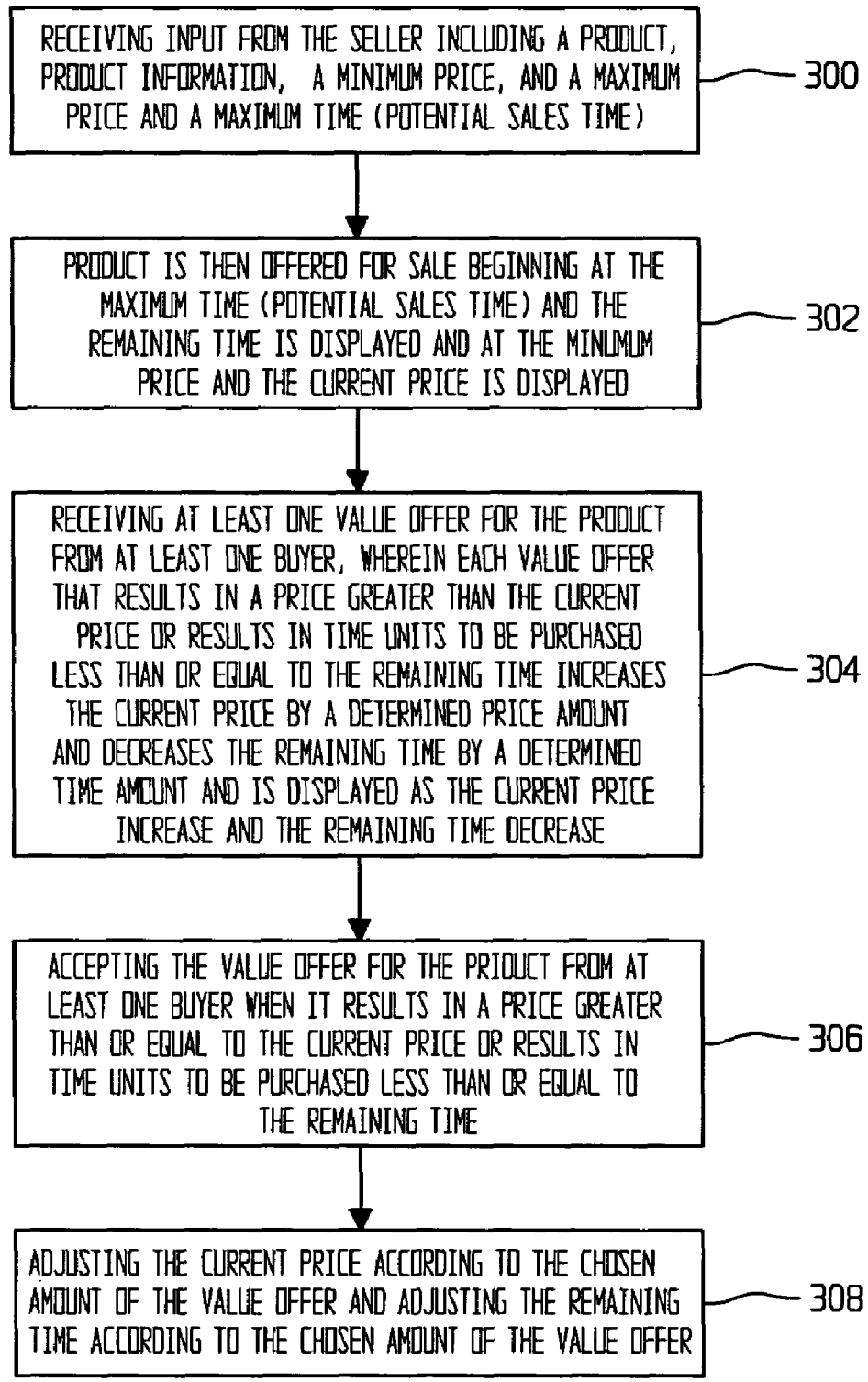
FIG. 3 depicts a flowchart according to the present invention.

According to a preferred embodiment, as shown in FIG. 3, a method for facilitating a trade comprising the steps of (300) receiving input from the seller including a product, product information, a minimum price, a maximum price and a maximum time (potential sales time (210)). By way of example, the product may be a box of pencils (Sanford Mechanical Pencils 0.7 mm), the minimum price may be set at 50 cents (in American dollars) and the maximum time (potential sales time (210)) may be chosen to be twelve hours. The value of the time unit is calculated at 0.01 cents per second. The product is then offered for sale beginning at the minimum price and maximum time (potential sales time (210)) and the current price (at the start of the trade equal to the minimum price) and the remaining time (302) (at the start of the trade equal to the maximum time) is displayed. So, according to our example a clock is displayed that counts down from twelve hours. Buyers may now make a value offer for the product, the method may comprise the step of receiving at least one value offer for the product from at least one buyer, wherein each value offer that results in a price greater than the current price or results in time units to be purchased less than or equal to the remaining time increases the current price by a determined price amount and decreases the remaining time remaining by a determined time amount and is displayed as the current price increase and the remaining time decrease (304). At least one value offer for the product may be accepted from at least one buyer when the value offer results in a price greater than or equal to the current price or results in time units to be purchased less than or equal to the remaining time. (Compare details of requirements for acceptance and the resulting scenarios above.) (306) Upon acceptance of the value offer the price increase and the time decrease is irrevocable and is displayed as the current price and the remaining time. For example, a starting offer may be made by Buyer1 for 50 cents, this being the minimum price. A next offer may be made by Buyer2 for 60 cents, which would decrease the remaining time by another 1000 seconds. The time decrease may be a set number (for example 100 seconds) or may be according to a formula. For example, it may be desirable for products that do not have high numbers of buyers to have a greater time decrease per value offer. In this way, the sale is hurried along. However, each increase in the current price decreases the remaining time. Other options may include: the seller may be willing to offer one price for quick sale and one price based upon waiting five days. Also, typically where a product has a great deal of momentum (i.e. a number of offers) the seller may be less inclined to accept a lower price or close the offer for sale. Therefore, it would make sense to decrease the time remaining by a smaller determined amount. On the other hand, a product that is offered for sale with very few offers, it may be desirable to decrease the time remaining by a larger determined amount. This also has the effect of adding some excitement to the purchasing process. The buyer may not know how much the determined amount is, and must gamble not only on the price but on the amount of time remaining. The maximum price may also be adjusted according to a characteristic of the value offer (308). The term "characteristic" of the value offer may be as any item of information that may be ascertained by the acceptance of a value offer and may include: buyer information, length of time between value offers and number of buyers.

While the buyer is interested in purchasing the product, they are (in a sense) purchasing time. Currency is exchanged for time. At any given point during the remaining time, currency can be exchanged for all the remaining time. And buying all remaining time buys the product. In this way by actively (offering a price higher than the current price) moving the price higher, the time goes lower. By actively (offering a time lower than the remaining time) moving the time lower, the price moves up. If potential buyers passively allow time to slip by, the overall value slips as well. The last value offer buys the product. The last additional price increase or time decrease moves the clock to zero or it is high enough that no other buyer wants to top it and the clock automatically runs to zero.

The highest achievable potential price which theoretically is the maximum price can be adjusted according to fixed and coincidental trade characteristics. These characteristics may include the seller input relating to the minimum price, maximum price and maximum time and buyer input including buyer information, length of time between value offers and the amount of the price offer or the time offer and the difference between value offers, specific engagement rules of this marketplace, specific calculation of a cost of a time unit and the number of buyers. The sale can be offered either in person or over the Internet, and can be in either a fixed or open market. While the product or service of interest, can be sold individually, or in multiple quantities. Additionally maximum price may or may not be known to the potential buyer.

Figure 4:
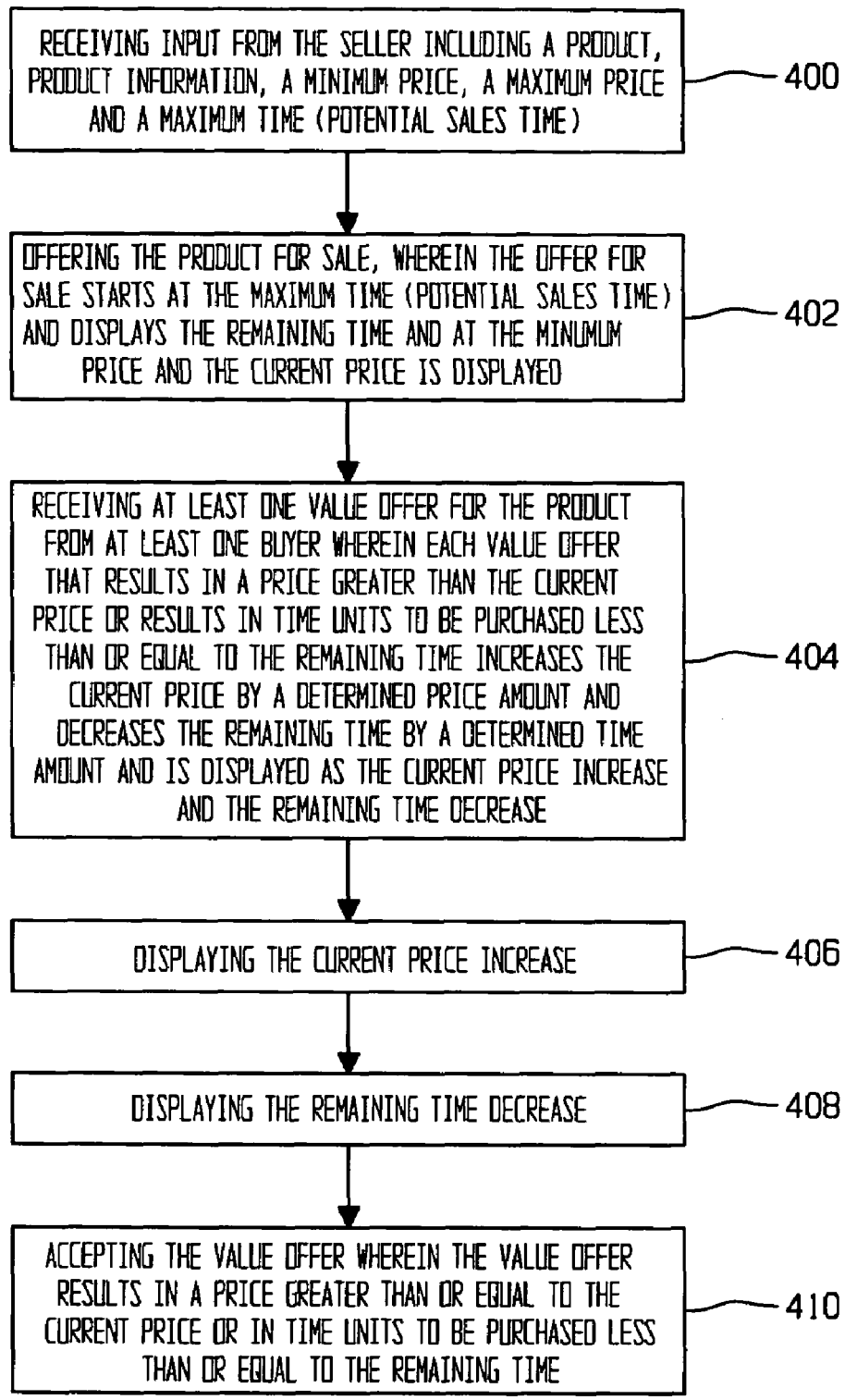
FIG. 4 depicts a flowchart according to the present invention.

FIG. 4 depicts a computer implemented method for facilitating a trade over the Internet. The method comprising the steps of: (400) receiving input from the seller including a product, product information, a minimum price, a maximum price, a maximum time (potential sales time); (402) offering the product for sale, wherein the offer for sale starts at the minimum price, at the maximum time (potential sales time) and displays the current price and the time remaining; (404) receiving at least one value offer for the product from at least one buyer, wherein each value offer that results in a price greater than the current price or results in time units to be purchased less than or equal to the remaining time increases the current price by a determined price amount and decreases the remaining time by a determined time amount; (406) displaying the current price increase; (408) displaying the remaining time decrease; (410) accepting said value offer wherein said value offer results in a price greater than or equal to the current price or in time units to be purchased less than or equal to the remaining time. (Compare details of requirements for acceptance and the resulting scenarios above.) Upon acceptance of the value offer the price increase and the time decrease is irrevocable and is displayed as the current price and the remaining time.

Figure 5:
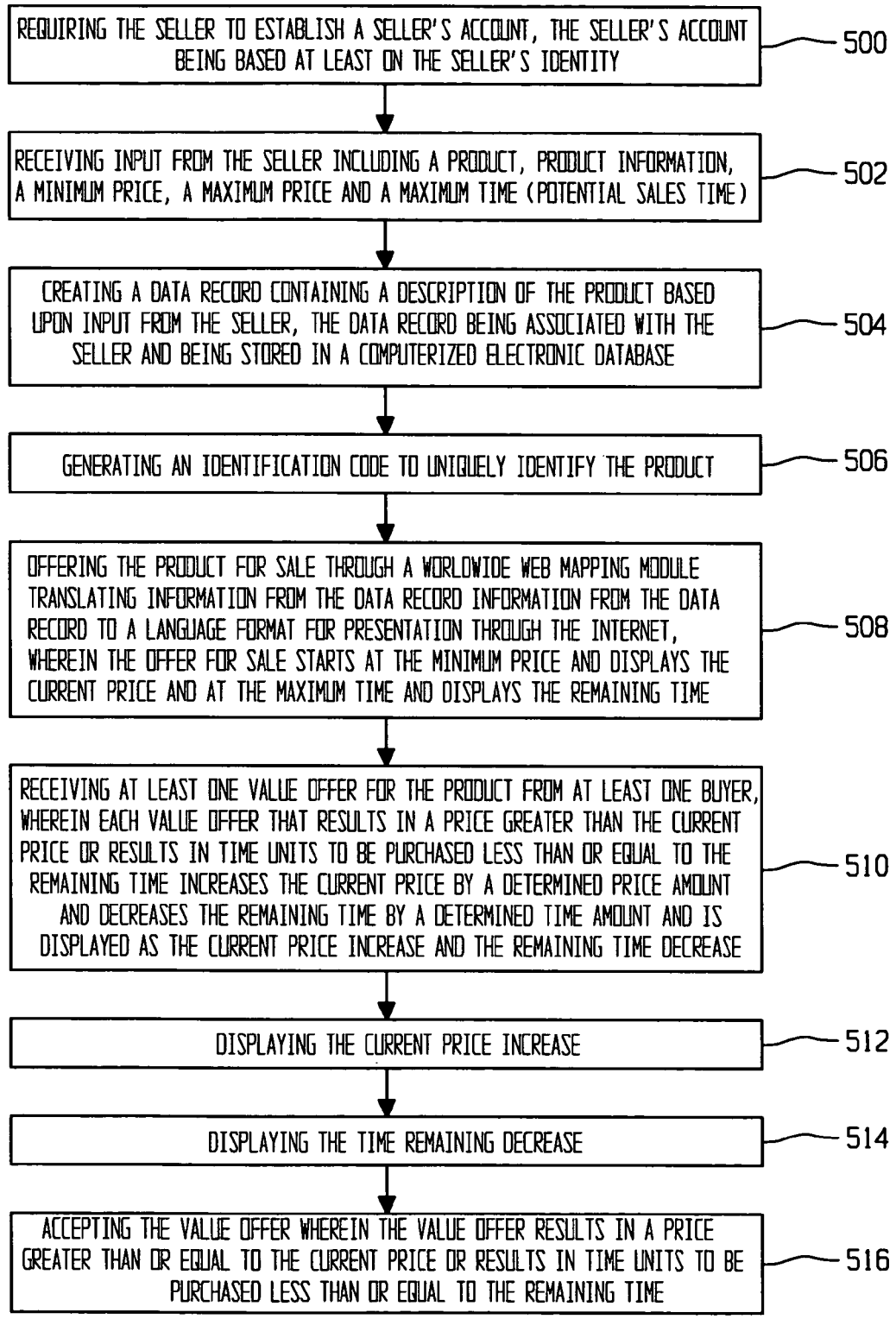
FIG. 5 depicts a flowchart according to the present invention.

FIG. 5 depicts a computer implemented method for facilitating a trade over the Internet comprising. (500) requiring the seller to establish a seller's account, the seller's account being based at least on the seller's identity; (502) receiving input from the seller including a product, product information, a minimum price, a maximum price and a maximum time (potential sales time); (504) creating a data record containing a description of the product based upon input from the seller, the data record being associated with the seller and being stored in a computerized electronic database; (506) generating an identification code to uniquely identify the product; (508) offering the product for sale through a worldwide web mapping module translating information from the data record to a language format for presentation through the internet, wherein the offer for sale starts at the minimum price, the maximum time and displays the current price (being equal to the minimum price at the start of the trade) and the time remaining (being equal to the maximum time at the start of the trade); (510) receiving at least one value offer for the product from at least one buyer, wherein each value offer that results in a price greater than the current price or results in time units to be purchased less than or equal to the remaining time increases the current price by a determined price amount and decreases the remaining time by a determined time amount; (512) displaying the current price increase; (514) displaying the remaining time decrease; and (516) accepting said value offer wherein the value offer results in a price greater than or equal to the current price or results in time units to be purchased less than or equal to the remaining time. (Compare details of requirements for acceptance and the resulting scenarios above.) Upon acceptance of the value offer, the price increase and the time decrease is irrevocable and is displayed as the current price and the remaining time.

The present invention provides a transaction machine which will always bring about predictable results and simplifies transactions between sellers and buyers. The seller decides on the minimum price, the maximum price and the maximum time which is the potential sales time of the item. To buy an item the buyer needs to reduce the time to zero. He not so much buys the product as he buys the units of time related to the product. The countdown begins at a chosen starting point and runs to zero automatically or jumps towards zero when a buyer purchases a block of time.

The buyer can initiate a transaction by entering data into at least one of the following input fields: "Ideal Price" or "Current Price increased by" or "Time Target" or "Remaining Time decreased by" or "Visual Presentation of Currency" or "Visual Representation of Time". Data changed in one field will change the data in the other fields. Additionally the buyer can indicate the number of items he wishes to receive (If only one item is sold no change in number is possible). For basic function of the system not all entry fields have to be present in the graphic. Only one currency entry field inserted into the currency axis and one time indicator field inserted into the time axis are theoretically necessary for the correct functioning. Alternatively only one currency indicator field inserted into the currency axis and one time entry field inserted into the time axis are theoretically necessary for the correct functioning. In practice the user will always want, for orientation purposes, the indicator fields showing the current price and the remaining time. Without them he may lose track of the trade status. In this case we have chosen all fields to be present.

The item is sold to the buyer who sets the clock to zero. In an effort to bring the clock to zero the buyer always purchases units of time. The value of a unit of time is calculated by the difference between minimum price and maximum price divided by the maximum time (the total original beginning amount of time the item is potentially available) which are chosen by the seller. Dividing the difference between minimum price and maximum price by the total number of seconds of the original chosen time period results in the value per unit of the smallest and therefore the most flexible time units that can be purchased.

Minimum price, maximum price and the length of the potential sales time of the item are chosen by the seller. At the moment of the publication of the offer up to the start of the trade the Current Price is the minimum price, the Remaining Time is the length of the time period chosen by the seller. With the start of the trade, the first sales click, (theoretically any other starting point can be chosen) the clock begins the countdown. Is the first value offer equal to the minimum price then the Current Price stays unchanged while the Remaining Time starts to decrease automatically. Only a value offer above the minimum price can purchase units of time and can reduce the Remaining Time by buying up amounts of time. As soon as a transaction occurs the Current Price reflects the minimum price (only possible in the FIRST transaction) or the minimum price plus the price of the time units sold at the pre-calculated value (see above), the Remaining Time reflects the original length of time the item is potentially available minus any purchased time units minus any time lag in which no transaction was done (see sample transaction sequence below).

The minimum price is the price at which the trade begins when the transaction is initiated. The maximum price is the price to be paid if the buyer wants to receive the item at the very beginning of the trade. In order to set the clock to zero he has to buy the total original beginning time the item is potentially available which at the very start of the trade requires payment of the maximum price. This type of transaction finalizes the sale. The item has been purchased by this buyer and is now unavailable to other buyers.

Alternatively a buyer can enter only the minimum price into the data field. This will start the trade. If no buyers purchase time units the clock will automatically run towards zero. When it reaches zero this sole buyer will receive the item for the minimum price. The item has been purchased by this buyer and is now unavailable to other buyers.

In a normal transaction sequence a first buyer will either enter the minimum price or will increase the minimum price in order to purchase a unit(s) of time. This will start the trade. Other buyers will buy additional time units and each time the clock will make a jump towards zero according to the amount of time that has been bought. In the time lag from one transaction to the next the clock will continue towards zero automatically. The longer the time lag or the more often it occurs the bigger the automatic decrease in the amount of remaining time. This results in a final purchase price that is lowered in relation to the maximum price as less time units remain for sale. Now the clock can be set to zero for less currency.—The final buyer is the one who sets the clock to zero. As he gets the item the final buyer is the only buyer who pays out actual currency. All previous buyers are only potential buyers and are now out of the running and do not pay anything.

Normally the final purchase price will lie somewhere between the minimum and the maximum price depending on how much time has been purchased by the buyers. As amounts of time are purchased the time is decreased by those blocks of bought time. Obviously the buying of time units will raise the current price for the item. As transactions occur the time decreases and the price increases. When no transactions occur only the time decreases and the current price remains unchanged. The greater the time lag—time without any transactions that produces unsold units of time—the more the maximum price is lowered and the item gets increasingly cheaper.

The following example is intended to provide a better understanding of the present invention. The seller may input a minimum price as 10 currency units, a maximum price of 110 currency units. As such, the difference between mini- mum price and the maximum price is 100 currency units. The seller may also chose the time the item is potential available. In the current example, the time is chosen by the seller to be 10 time units. As such, the cost of time unit is the difference between min./max. price divided by number of time units: 100:10=10 (Difference between min./max. price is 100 divided by chosen time the item is potentially available which is 10 time units). So according to this example, 1 unit of time costs 10 units of currency.

After the trade started the buyer can purchase units of time by indicating the price he is willing to pay: the minimum price plus the cumulated currency value of time units already sold—which represents the current price—plus the currency value for the amount of time he plans to buy. He enters this data into the fields of the "Ideal Price" or "Visual Representation of Currency". Or he enters the additionally currency value necessary for the amount of time he plans to buy into "Current Price increased by". Entered data in one field will create corresponding values in the other currency fields. It will also automatically produce entries in the fields of "Time Target" and "Visual Representation of Time" showing a lesser remaining time relative to the amount of time his price will buy. In "Remaining Time decreased by" the additional amount of time he can buy with the entered currency will be shown.

Alternatively he can buy units of time by indicating the point in time to which he plans to reduce the remaining time. He enters this data into the fields of the "Time Target" or into the "Visual Representation of Time". Or he enters the amount of time he plans to buy into "Remaining Time decreased by". Entered data in one field will create corresponding values in the other time fields. It will also automatically produce entries in the fields of the "Ideal Price" and the "Visual Representation of Currency" relative to the cost of the purchased block of time. In "Current Price increased by" the cost of the additional units of time to be purchased will be shown.

He finalizes his transaction by pressing a sales device in order to transmit his data to the database. Only then the indicator fields of "Current Price" and "Remaining Time" will be changed—irrevocably so—to the new values and the visual representation (if set to have an indicator function) of currency and time is locked into the new position. The start of the trade—the first sales click—(theoretically any other starting point can be chosen) starts the clock running. The first set of transaction values sent to the database starts the trade. Normally the Remaining Time will be reduced through the sale of time units or through time lag. The seller

TABLE 1

| Buyer | Amount of time units bought | Cost per time unit (in currency units) | Original time was 10 time units. It decreased to | Minimum price was 10 currency units. It increased to |
|---|---|---|---|---|
| A | 1 | 10,00 | 9 | 20,00 |
| B | 1 | 10,00 | 8 | 30,00 |
| C | 2 | 10,00 | 6 | 50,00 |
| D | 1 | 10,00 | 5 | 60,00 |
| No buyer | No transaction Time decreases automatically. 1 time unit remain unsold. | 0 | 4 | 60,00 |
| E | 1 | 10,00 | 3 | 70,00 |
| F | 2 | 10,00 | 1 | 90,00 |
| G | 1 | 10,00 | 0 | 100,00 |
| G is final buyer | | | Clock to zero | 100,00 is final price |

Due to the specific, predetermined values (cost per time unit) and due to the coincidental factors (number of buyers, number of time units sold, length of time lag) a transaction for an identical item can reach a different final sales price. This transaction: Time units sold: 9. Time units "lost" during time lag: 1. The final price is 9.1% below the maximum price.

can chose certain options that will radically reduce the Remaining Time to a set point in time with a transaction. Now the Remaining Time is drastically lowered within an instant. The number of remaining time units is reduced compared with the original situation. The cost per single unit has risen. Now the item can potentially sell faster and any time lag produces a faster and more favorable buy.

The underlying principle is: "change in currency=change in time"/"change in time=change in currency". This is the foundation. This principle can be expressed in an endless mix and variety of the methods to send the price up and the time down. Reaching a certain plateau of time or of price could trigger a discount sale or speed up or slow down the increase in price or decrease in time. A phase where the price or the time progression is suspended for a while could be possible. And so on.—Any combination of options could be implemented in order to increase price and decrease time.

One such option is the hidden maximum price. The seller may wish to hide the maximum price if he is not certain about the market value of his item. He will let the market decide on the final price. In this case the seller still needs to choose a minimum and maximum price. On this basis the price for the original time units will be calculated. After the first transaction each subsequent sale of time units will calculate the time units at a certain percent rate higher than the previous sale (e.g. 15% higher or even higher or lower than 15%. This is just a sample value). Now the price of the units of time increases with each transaction. If the first buyer chooses to snap up the item he can still do so for the—hidden—maximum price the seller chose for calculation purposes. But the higher the number of buyers involved, the higher the number of small amounts of time units sold the higher the final sale price can go above the original—hidden—maximum price.

Table 2 depicts a hidden maximum price transaction sequence for one item. The seller chooses the minimum price, maximum price and length of online time. For example, the chosen minimum price is 10 currency units, the chosen maximum price is 110 currency units and the difference between minimum price and the maximum price is 100. The chosen time the item is potentially available: 10 time units. Cost of a time unit is the difference between min./max. price divided by number of time units: 100:10=10 (difference between min./max. price is 100 divided by the chosen time the item is potentially available: 10 time units) 1 unit of time costs 10 units of currency. In this sample cost per unit increases 15% over the previous sale with each new transaction.

Due to the specific, predetermined values (cost per time unit) and due to the coincidental factors (number of buyers, number of time units sold, length of time lag) a transaction for an identical item can reach a different final sales price. This transaction: Time units sold: 9. Time units "lost" during time lag: 1. The final price is 44% above the maximum price. The transaction "Hidden maximum Price" compared to the normal transaction can achieve an end sale price that usually is higher. In this comparison it is 53% higher than the normal transaction result. The market decided the value.

A first buyer, user A, starts the trade of an offered item by entering the minimum price into "Ideal Price". This entry creates corresponding entries in all other entry fields on the currency and the time axis. Depending on the chosen starting point of the time countdown the Remaining Time is equal with the original online time (Chosen by the seller) or has already been decreased automatically. If the user A decides to enter a higher than the minimum price he is buying time units and the remaining time will decrease by that amount. He may also enter the number of items he wishes to buy if more than several identical items are available for sale. After sending his values to the database by pressing the necessary sales device he will have changed the values for the "Current Price" and the "Remaining Time" which in turn will adjust the visual representation of currency and time.

The next buyer, user B, enters the currency amount he is willing to increase the "Current Price" by into the data field of "Current Price increased by". This entry creates corresponding entries in all other entry fields on the currency and the time axis. User B is buying a certain number of time units with his additional currency amount entered and the remaining time will decrease by that amount. The change in time will be reflected in the time entry fields. He may also enter the number of items he wishes to buy if more than several identical items are available for sale. After sending his values to the database by pressing the necessary sales device he will have changed the values for the "Current Price" and the "Remaining Time" which in turn will adjust the visual representation of currency and time.

To achieve a higher price than the previous buyer the next buyer, user C, enters his chosen currency amount into the

TABLE 2

| Buyer | Amount of time units bought | Cost per time unit (in currency units) After first transaction unit price increases 15% over previous. | Original time was 10 time units. It decreased to | Minimum price was 10 currency units. It increased to |
|---|---|---|---|---|
| A | 1 | 10,00 | 9 | 20,00 |
| B | 1 | 11,50 | 8 | 31,50 |
| C | 2 | 13,23 | 6 | 57,96 |
| D | 1 | 15,21 | 5 | 73,17 |
| No buyer | No transaction Time decreases automatically. 1 time units remain unsold. | 0 | 4 | 73,17 |
| E | 1 | 17,49 | 3 | 90,66 |
| F | 2 | 20,11 | 1 | 130,88 |
| G | 1 | 23,13 | 0 | 154,01 |
| G is final buyer | | | Clock to zero | 154,01 is final price | data field of "Visual Representation of Currency". This entry creates corresponding entries in all other entry fields on the currency and the time axis. With upping the present price user C is buying a certain number of time units and the remaining time will decrease by that amount. The change in time will be reflected in the time entry fields. He may also enter the number of items he wishes to buy if more than several identical items are available for sale. After sending his values to the database by pressing the necessary sales device he will have changed the values for the "Current Price" and the "Remaining Time" which in turn will adjust the visual representation of currency and time.

Now no buyer is present. No input is done. The clock continues to run and time decreases automatically. As no one is buying time units the "Current Price" remains stable at the level of the last transaction while "Remaining Time" is lowered depending on the length of the time lag. While user C saw the price increase to his chosen level and the time decrease in relation to the price increase the next user will see the end price of user C but a time value that is lower than the one of user C.

Instead of entering a currency amount the next buyer, user D, enters the point in time to which he is willing to decrease the "Remaining Time" into the data field of "Time Target". This entry creates corresponding entries in all other entry fields on the currency and the time axis. User D is buying a certain number of time units the cost of which is reflected in the currency entry fields. The present price will be increased by the cost of those time units. He may also enter the number of items he wishes to buy if more than several identical items are available for sale. After sending his values to the database by pressing the necessary sales device he will have changed the values for the "Current Price" and the "Remaining Time" which in turn will adjust the visual representation of currency and time.

The next buyer, user E, enters the amount of time units he is willing to decrease the "Remaining Time" by into the data field of "Remaining Time decreased by". This entry creates corresponding entries in all other entry fields on the currency and the time axis. User E is buying a certain number of time units the cost of which is reflected in the currency entry fields. The present price will be increased by the cost of those time units. He may also enter the number of items he wishes to buy if more than several identical items are available for sale. After sending his values to the database by pressing the necessary sales device he will have changed the values for the "Current Price" and the "Remaining Time" which in turn will adjust the visual representation of currency and time.

The next buyer, user F, enters his chosen amount of time units into the data field of "Visual Representation of Time". This entry creates corresponding entries in all other entry fields on the currency and the time axis. User E is buying a certain number of time units the cost of which is reflected in the currency entry fields. The present price will be increased by the cost of those time units. He may also enter the number of items he wishes to buy if more than several identical items are available for sale. After sending his values to the database by pressing the necessary sales device he will have changed the values for the "Current Price" and the "Remaining Time" which in turn will adjust the visual representation of currency and time.

The next buyer, user G, enters his chosen amount of time units into the data field of "Visual Representation of Time". This entry creates corresponding entries in all other entry fields on the currency and the time axis. User G is buying all remaining time units the cost of which is reflected in the currency entry fields. The present price will be increased by the cost of those time units. This price is the optimal price that can be achieved under the present circumstances. As now all time has been sold the clock is set to zero. He may also enter the number of items he wishes to buy if more than several identical items are available for sale. After sending his values to the database by pressing the necessary sales device he will have changed the values for the "Current Price" and the "Remaining Time" which in turn will adjust the visual representation of currency and time. Now User G is the final buyer. He receives the item. The sale is closed. The item is now unavailable to any other buyers.

There may also be other special cases. At the very beginning of the chosen point for the clock to start the countdown User 1 definitely wants to purchase the item. In order to accomplish this he needs to buy the complete "Remaining Time" so that the clock is set to zero. To purchase that amount of time which equals the original time the item is potentially available he has to pay the maximum price. As no time lag has reduced the "Remaining Time", the maximum price that can be achieved has not been lowered by passed but unsold time units. Under the circumstances nothing but the maximum currency entered into one of the required data fields or the maximum time units entered into one of the time data fields will accomplish this.

An entry in one field creates corresponding entries in all other entry fields on the currency and the time axis. He may also enter the number of items he wishes to buy if more than several identical items are available for sale. After sending his values to the database by pressing the necessary sales device he will have changed the values for the "Current Price" and the "Remaining Time" which in turn will adjust the visual representation of currency and time. Those values are now: "Current Price" equals maximum price, "Remaining Time" equals zero. User 1 is the sole and final buyer. He receives the item. The sale is closed. The item is now unavailable to any other buyers.

Before any automatic reduction of time (This depends on the chosen starting point of the time countdown) User 2 is the first buyer to appear and enters the minimum price and starts the trade. His entry creates corresponding entries in all other entry fields on the currency and the time axis. Under the circumstances those values reflect the status quo since only the trade started and no time units were sold. He may also enter the number of items he wishes to buy if more than several identical items are available for sale. By pressing the necessary sales device he will have entered those values into the database. The trade has started but the currency value remains at status quo, "Current Price" IS minimum price while the "Remaining Time" begins its countdown. The visual representation of currency remains unchanged. The visual representation of time starts to slide towards zero. Potentially other buyers can relieve him of his position by entering a higher price and buying units of time. No other buyer appears. The clock runs to zero without any other input. A total time lag has reduced the "Remaining Time" to zero. All time units have passed unsold. The minimum price is the highest price that set the clock to zero. User 2 is the sole and final buyer. He receives the item. The sale is closed. The item is now unavailable to any other buyers.

An item is published and offered for sale. In this example the very beginning of publication is the chosen point for the clock to start the countdown. No buyer appears, no input is occurs, no time units are sold. The clock runs to zero without any input. A total time lag has reduced the "Remaining Time" to zero. Time has run out without any time units having been sold. The sale is closed. The item remains unsold. The item is now unavailable to any buyers.

It should be understood that the foregoing relates to preferred embodiments of the invention and that modifications may be made without departing from the spirit and scope of the invention as set forth in the following claims.

We claim:

1. A computer implemented method for facilitating a trade over the Internet comprising the steps of:
   receiving input from a seller wherein said input includes a product, product information, a minimum price, a maximum price and a maximum time;
   offering said product for sale wherein said offer for sale starts at said minimum price and said maximum time and displays a current price and a remaining time;
   receiving at least one value offer for said product from at least one buyer, wherein said step of receiving at least one value offer is a first value offer;
   displaying said first value offer;
   accepting said first value offer when said first value offer results in a price greater than or equal to said minimum price and greater than or equal to said current price and results in time units to be purchased less than or equal to said remaining time; increasing said current price by a determined price amount and decreasing said remaining time by a determined time amount for each said first value offer that results in a price greater than said minimum price and greater than said current price and results in time units to be purchased less than or equal to said maximum time and less than or equal to said remaining time; and
   displaying said first value offer as the current price and the remaining time.

2. A method as in claim 1, further comprising the step of:
   receiving at least one value offer for said product from at least one buyer, wherein said step of receiving said at least one value offer is a subsequent value offer;
   displaying said subsequent value offer;
   accepting said subsequent value offer wherein each said subsequent value offer results in a price greater than said current price and results in time units to be purchased smaller than said remaining time;
   increasing said current price by a determined price amount and decreasing said remaining time by a determined time amount for each said subsequent value offer that results in a price greater than said current price and results in time units to be purchased less than said remaining time; and
   displaying said subsequent value offer as the current price and remaining time.

3. A method as in claim 1, further comprising the step of:
   receiving at least one value offer for said product from at least one buyer wherein said step of receiving said at least one value offer is a final value offer;
   displaying said final value offer;
   accepting said final value offer wherein said final value offer results in a price greater than said current price and results in time units to be purchased which set said remaining time to zero;
   increasing said current price by a determined price amount and decreasing said remaining time by a determined time amount to zero for said final value offer that results in a price greater than said current price and results in time units to be purchased equal to said remaining time; and
   displaying said final value offer as the current price and remaining time.

4. A method as in claim 1, wherein said value offer is selected from the group consisting of a time offer and a price offer.

5. A method as in claim 1, wherein said determined time amount is calculated by dividing said price offer by the value of a unit of time to provide said determined time amount.

6. A method as in claim 1, wherein said determined price amount is calculated by multiplying said time offer by the value of a unit of time to provide said determined price amount.

7. A method as in claim 1, further comprising the step of: adjusting said current price according to the determined price amount.

8. A method as in claim 1, further comprising the step of: adjusting said remaining time according to the determined time amount.

9. A method as in claim 1, further comprising the step of: sending said value offer to a database for acceptance by using a sales function device.

10. A method as in claim 1, further comprising the step of: displaying a change in said current price.

11. A method as in claim 1, further comprising the step of: displaying a change in said remaining time.

12. A method as in claim 1, further comprising the step of: displaying said minimum price.

13. A method as in claim 1, wherein said product is electronically offered for sale over the Internet.

14. A method as in claim 1, wherein said value offers made on said product for sale can only be made by buyers who have registered to use the sales function with which said value offers can be made.

15. A method as in claim 1, wherein said input is further comprised of a desired quantity from said seller.

16. A method as in claim 1, further comprising the step of: displaying said maximum price.

17. A method as in claim 1, further comprising the step of: displaying the current price in different currencies.

18. A method as in claim 1, further comprising the step of: delivering said product.

19. An automated method, performed by a computer for facilitating a trade over the Internet comprising the steps of:
   receiving input from a seller wherein said information includes a product, product information, a minimum price, a maximum price and a maximum time;
   creating a data record containing a description of said product based upon input from said seller, said data record being associated with said seller and being stored in a computerized electronic database;
   generating an identification code to uniquely identify said product;
   offering said product for sale through a worldwide web mapping module translating information from the data record to a language format for presentation through the Internet, wherein said offer for sale starts at said minimum price and said maximum time and displays a current price and a remaining time;
   receiving at least one value offer for said product from at least one buyer, wherein said step of receiving at least one value offer is a first value offer;
   displaying said first value offer;
   accepting said first value offer when said first value offer results in a price greater than or equal to said minimum price and greater than or equal to said current price and results in time units to be purchased less than or equal to said remaining time and less than or equal to said maximum time;

increasing said current price by a determined price amount and decreasing said remaining time by a determined time amount for each said first value offer that results in a price greater than said minimum price and greater than said current price and results in time units to be purchased less than or equal to said remaining time and less or equal to than said maximum time; and displaying said first value offer as the current price and the remaining time.

20. A method as in claim 19, further comprising the step of:

receiving at least one value offer for said product from at least one buyer, wherein said step of receiving said at least one value offer is a subsequent value offer;

displaying said subsequent value offer;

accepting said subsequent value offer wherein each said subsequent value offer results in a price greater than said current price and results in time units to be purchased smaller than said remaining time;

increasing said current price by a determined price amount and decreasing said remaining time by a determined time amount for each said subsequent value offer that results in a price greater than said current price and results in time units to be purchased less than said remaining time; and displaying said subsequent value offer as the current price and remaining time.

21. A method as in claim 19, further comprising the step of:

receiving at least one value offer for said product from at least one buyer wherein said step of receiving said at least one value offer is a final value offer;

displaying said final value offer;

accepting said final value offer wherein said final value offer results in a price greater than said current price and results in time units to be purchased which set said remaining time to zero;

increasing said current price by a determined price amount and decreasing said remaining time by a determined time amount to zero for said final value offer that results in a price greater than said current price and results in time units to be purchased equal to said remaining time; and displaying said final value offer as the current price and remaining time.

22. A method as in claim 19, wherein said value offer is selected from the group consisting of a time offer and a price offer.

23. A method as in claim 19, wherein said determined time amount is calculated by dividing said price offer by the value of a unit of time to provide said determined time amount.

24. A method as in claim 19, wherein said determined price amount is calculated by multiplying said time offer by the value of a unit of time to provide said determined price amount.

25. A method as in claim 19, further comprising the step of:

adjusting said current price according to the determined price amount.

26. A method as in claim 19, further comprising the step of:

adjusting said remaining time according to a determined time amount.

27. A method as in claim 19, further comprising the step of:

sending said value offer to a database for acceptance by using a sales function device.

28. A method as in claim 19, further comprising the step of:

displaying a change in said current price.

29. A method as in claim 19, further comprising the step of:

displaying a change in said remaining time.

30. A method as in claim 19, further comprising the step of:

displaying said minimum price.

31. A method as in claim 19, wherein said product is electronically offered for sale over the Internet.

32. A method as in claim 19, wherein said value offers made on said product for sale can only be made by buyers who have registered to use a sales function with which said value offers can be made.

33. A method as in claim 19, wherein said input is further comprised of a desired quantity from said seller.

34. A method as in claim 19, further comprising the step of:

displaying said maximum price.

35. A method as in claim 19, further comprising the step of:

displaying the current price in different currencies.

36. A method as in claim 19, further comprising the step of:

delivering said product.

37. A system for processing the sale of a good or service comprising:

a memory device;

a processor disposed in communication with said memory device wherein said processor further comprises the ability to:

receive input from a seller, said input including a product, product information, a minimum price, a maximum price and a maximum time;

offer said product for sale, wherein said offer for sale starts at said minimum price and said maximum time and displays a current price and a remaining time;

receive at least one value offer for said product from at least one buyer, wherein said step of receiving at least one value offer is a first value offer;

display said first value offer;

accept said first value offer when said first value offer results in a price greater than or equal to said minimum price and greater than or equal to said current price and results in time units to be purchased less than or equal to said remaining time and less than or equal to said maximum time;

increase said current price by a determined price amount and decreasing said remaining time by a determined time amount for each said first value offer that results in a price greater than said minimum price and greater than said current price and results in time units to be purchased less or equal to said remaining time and less than or equal to said maximum time; and display said first value offer as the current price and the remaining time.

38. A system as in claim 37, further comprising the ability of the processor to:

receive at least one value offer for said product from at least one buyer, wherein said said at least one value offer is a subsequent value offer;

display said subsequent value offer;

accept said subsequent value offer wherein each said subsequent value offer results in a price greater than said current price and results in time units to be purchased smaller than said remaining time;

increase said current price by a determined price amount and decreasing said remaining time by a determined time amount for each said subsequent value offer that results in a price greater than said current price and results in time units to be purchased less than said remaining time; and display said subsequent value offer as the current price and remaining time.

39. A system as in claim 37, further comprising the ability of the processor to:

receive at least one value offer for said product from at least one buyer wherein said at least one value offer is a final value offer;

display said final value offer;

accepting said final value offer wherein said final value offer results in a price greater than said current price and results in time units to be purchased which set said remaining time to zero;

increase said current price by a determined price amount and decrease said remaining time by a determined time amount to zero for said final value offer that results in a price greater than said current price and results in time units to be purchased equal to said remaining time; and display said final value offer as the current price and remaining time.

40. A method as in claim 37, wherein said value offer is selected from the group consisting of a time offer and a price offer.

41. A system as in claim 37, wherein said determined time amount is calculated by dividing said price offer by the value of a unit of time to provide said determined time amount.

42. A system as in claim 37, wherein said determined price amount is calculated by multiplying said time offer by the value of a unit of time to provide said determined price amount.

43. A system as in claim 37, further comprising the ability of the processor to:

adjust said current price according to the determined price amount.

44. A system as in claim 37, further comprising the ability of the processor to:

adjust said remaining time according to the determined time amount.

45. A system as in claim 37, further comprising the ability of the processor to:

send said value offer to a database for acceptance by using a sales function device.

46. A system as in claim 37, further comprising the ability of the processor to:

display a change in said current price.

47. A system as in claim 37, further comprising the ability of the processor to:

display a change in said remaining time.

48. A system as in claim 37, further comprising the ability of the processor to:

display said minimum price.

49. A system as in claim 37, wherein said product is electronically offered for sale over the Internet.

50. A method as in claim 37, wherein said value offers made on said product for sale can only be made by buyers who have registered to use the sales function with which said value offers can be made.

51. A system as in claim 37, wherein said input to said processor is further comprised of a desired quantity from said seller.

52. A system as in claim 37, further comprising the ability of the processor to:

display said maximum price.

53. A system as in claim 37, further comprising the ability of the processor to:

display the current price in different currencies.

54. A system as in claim 37, further comprising the ability of the processor to:

handle ensuring delivering said product.

55. A system comprised of multiple systems as in claim 37, each offering a different product for sale.

* * * * *